United States Patent [19]

Martischius et al.

[11] Patent Number: 4,675,348
[45] Date of Patent: Jun. 23, 1987

[54] PROCESS FOR OPTIMIZING THE PROPERTIES OF AQUEOUS POLYMER SOLUTIONS USED IN POLYMER FLOODING

[75] Inventors: Franz-Dieter Martischius, Biengarten; Dieter Karau; Werner Arnold, both of Plankstadt; Klaus Barthold, Mannheim, all of Fed. Rep. of Germany

[73] Assignee: BASF Aktiengesellschaft, Ludwigshafen, Fed. Rep. of Germany

[21] Appl. No.: 745,032

[22] Filed: Jun. 13, 1985

[30] Foreign Application Priority Data

Jun. 19, 1984 [DE] Fed. Rep. of Germany ....... 3422612

[51] Int. Cl.$^4$ .......................... C08J 3/10; C08L 33/26
[52] U.S. Cl. ................. 523/323; 252/8.554; 524/555
[58] Field of Search ......................... 523/323; 524/555; 252/8.554

[56] References Cited

U.S. PATENT DOCUMENTS 3,380,947  4/1968  Galgoczi ............................. 523/323
4,113,688  9/1978  Pearson ............................... 524/555

*Primary Examiner*—C. Warren Ivy
*Attorney, Agent, or Firm*—John C. Demeter; David L. Hedden

[57] ABSTRACT

The invention relates to a process for optimizing the properties of aqueous polymer solutions used for polymer flooding which comprises treating the polymer solutions under turbulent flow conditions in dynamic fluid dispersing or pumping equipment such that the residence time of the polymer solution in this equipment is less than approximately 20 seconds and the pump energy used is from about 1 to about 15 watts/liter of solution processed.

This process permits the optimization of flow properties important in polymer flooding which results in the improved efficiency of the polymer flooding process.

5 Claims, No Drawings

PROCESS FOR OPTIMIZING THE PROPERTIES OF AQUEOUS POLYMER SOLUTIONS USED IN POLYMER FLOODING

BACKGROUND OF THE INVENTION

1. Field of the Invention

This invention relates to a process for treating aqueous polymer solutions used in polymer flooding. The aqueous polymer solutions are treated under turbulent flow conditions at a specific pump energy and residence time.

2. Description of the Prior Art

Polymer flooding is a known method of tertiary oil recovery as detailed, for example, in *Nachr. Chem. Tech. Lab.* 27 (1979), No. 6. The use of water-soluble polymers in the flooding water lowers the mobility of the flooding medium, thus improving the effectiveness of flooding per unit volume. Compared to conventional water flooding, larger areas of the deposit can be treated and thus the oil can be recovered from larger areas, which significantly increases the degree of recovery for a deposit.

Most polymer flooding projects use partially saponified polyacrylamides, since these polymers exhibit the most pronounced viscosity-increasing characteristics in lowsaline waters. Preferably, so-called polymer emulsions are used at the start. Droplets of water are dispersed in an organic phase, which contains the polymer. After phaseinversion, the swollen polymer particles can then quickly dissolve in the aqueous phase, which is then continuous.

In order to optimize the flow properties in the deposit, the polymer solutions must meet a range of specifications. These specifications can then be shifted to match them to the type of conditions encountered in the deposit. In addition to chemical and biological long-term stability as well as insensitivity to outside ions, characteristics which will not be discussed further here, the following properties are of importance:

1. Minimum Pressure Increase in the Filtration Test

Although filtration tests using Millipore filters only approximately describe the flow processes in deposit rock, this test method has become standard (Kohler, N .G. Chauvetau, SPE 7435, 1978). The increase in pressure during the filtration test should be kept as low as possible.

2. Optimum Size of the Residual-Residence Factor (RRF)

The RRF is a factor indicating the extent to which the permeability of the rock has been reduced after polymer flooding. The optimum RRF for a polymer solution depends on the given deposit. As a rule, it is determined by simulation calculations. This means that it is necessary to match the RRF to deposit conditions.

3. Linearity of the Resistance Factor (RF) in the Minimum velocity Range ($V_D < 0.1$ m/d)

At the low flow velocities which occur in zones of extremely low permeability, the RF factor must not increase as in the medium-velocity range. Instead, it should assume a constant value, since otherwise it becomes even more difficult to flood the low permeability zones.

4. Minimal Increase in the Resistance Factor in the Injection Velocity Range ($10$ m/d $< V_D < 100$ m/d)

Based on viscoelastic properties, solutions of partially saponified polyacrylamides exhibit an undesired increase in their RF values in the range of typical injection velocities (Seright, R. S., SPE 9297, 1980). This makes it necessary to use an increased injection pressure, which often cannot be done because of the mechanical properties of the rock, since there would be danger of hydraulic cracking. In order to be able to inject sufficient amount of the polymer solution into the deposit, the resistance factor must not increase in the injection velocity range, or it must only increase slightly.

5. High Effective Viscosity in Pore Flow in the Medium Deposit Velocity Range ($0.1$ m/d $< V_D < 100$ m/d)

In order to maintain a pronounced mobility-reducing effect in the medium deposit velocity range, the effective viscosity of the polymer solutions in pore flows should be as high as possible and the measures required to improve the properties listed in sections 1 through 4 above should only be reduced slightly.

It is known that dissolved, partially saponified polyacrylamides may be broken down when subjected to mechanical loads. Thus, it is not recommended that centrifugal pumps be used when these solutions are to be pumped (D. Norgan, *Oil and Gas Journal*, 54: 1976). Since the higher molecular weight components are destroyed under mechanical stress, and since this adversely affects the properties cited in sections 1 through 4, the prior art teaches that the polymer solutions are subjected to controlled mechanical stress other than that caused by centrifugal pumps, in order to improve the properties cited under sections 1 through 4.

It is also known that flooding rock material typical of the site at sufficiently high flow rates and reusing the solutions improves the RF curve in the injection velocity range (R.S. Seright, SPE 9297, 1980). However, this observation cannot be utilized in the field for practical reasons. Subjecting the polymer solutions to subsequent shear through a perforated plate in accordance with Federal Republic of Germany Patent document 27 33 852 also improves rheology. According to this patent, the drop in pressure at the same flow rate remains constant for a given permeability and porosity of a rock pore or sand packing (the permeability and porosity are not described further). In addition, the curve of shear viscosity as a function of the shear rate is improved, and the injection pressure for flooding a sand packing is reduced from 0.38 bar to 0.16 bar, whereby the shear viscosity at a shear rate of 100 s$^{-1}$ is only reduced from 77.5 mPas to 7.3 mPas. It is also known from the Federal Republic of Germany Patent 33 03 895 that the filterability of a heteropolymeric sucrose solution can be improved through shear treatment in a colloid mill.

Thus, so far no process has become known which both optimizes the properties listed in sections 1 through 4 and meets the requirements cited in section 5.

SUMMARY OF THE INVENTION

The invention relates to a process for optimizing the properties of aqueous polymer solutions used for polymer flooding which comprises treating the polymer solutions under turbulent flow conditions in dynamic fluid dispersing or pumping equipment such that the residence time of the polymer solution in this equipment is less than approximately 20 seconds and the pump energy used is from about 1 to about 15 watts per litter of solution processed.

This process permits the optimization of flow properties important in polymer flooding which results in the improved efficiency of the polymer flooding process.

DESCRIPTION OF THE PREFERRED EMBODIMENTS

Polymer solutions which may be used are, preferably, solutions of copolymers of acrylamide and sodium acrylate or solutions of partially saponified polyacrylamide. For example, copolymers containing from 99 to 50 percent by weight acrylamide units and from 1 to 50 percent by weight acrylate units and which have a weight average molecular weight of from $1 \times 10^6$ to $40 \times 10^6$, preferably from $5 \times 10^6$ to $20 \times 10^6$, are especially well suited. Polymers of this type are described, for example, in U.S. Pat. No. 3,284,393.

As a rule, the polymer solutions contain the polymers in concentrations up to 5000 ppm. Here, the upper concentration limit is only due to the increasing viscosity, and the lower limit is based on the increasing costs for recovery using larger amounts of more dilute solutions. For this reason, it is preferable to use solutions having a polymer content up to 3000 ppm, more preferably a polymer content from about 2000 ppm to 3000 ppm. These solutions are then diluted after treatment in accordance with the invention to concentrations required for use of from 300 ppm to 2000 ppm.

The polymer solutions to be used in accordance with the invention are prepared in an essentially known manner (see, for example, Federal Republic of Germany Patent 2 154 081) in such a way that a water-in-oil polymer emulsion is converted to an oil-in-water emulsion, whereby the polymer dissolves in the water.

The polymer solutions are subjected to shear forces in dynamic liquid dispersing or pumping devices such as centrifugal pumps. The solutions can also be pumped in a loop so that they pass through the centrifugal pump several times until the desired polymer properties are obtained.

Dynamic dispersing and pumping devices are hydrodynamic flow machines, preferably single- or multiple-stage rotary centrifugal pumps such as radial centrifugal pumps (for instance Pfleiderer, Strömungsmaschinen, Verlag Springer). Turbulent flow conditions are flow conditions characterized by irregular variations in the velocity of the individual liquid particles. These varying movements cause an intense mechanical load to be exerted on the dissolved polymers, which improves their properties in the desired manner. Further details are given in *Technische Stromungslehre by E. Becker (Stuttgart: Teubner verlag, 1974)*.

The energy necessary to operate the pump is up to 15 watts/liter of the polymer solution being treated. Preferably, the energy consumption is maintained at from 2.5 to 10 watts/liter and the residence time is maintained at less than approximately 20 seconds, preferably from 3 seconds to 10 seconds. The residence time can be adjusted by using a static mixer, for example a device such as that described in Federal Republic of Germany Patent No. 2 525 020.

To perform the process of the invention, additives are dosed into the stream of water using a metering pump. The water is mixed in a static mixer and the polymer solution is metered in. The resulting mixture is inverted and the polymer solution is allowed to develop further. The polymer solution is then treated in the dynamic fluid dispersing or pumping equipment and is then diluted to the desired final concentration.

EXAMPLE 1

(Comparison Example)

In order to continuously produce 200 m³/day polymer solution at a polymer concentration of 700 ppm, 390 ml/minute of a water-in-oil emulsion containing 25 percent of a copolymer of 70 percent acrylamide and 30 percent sodium acrylate and having a weight average molecular weight of $6 \times 10^6$, was fed into a mixing device. A 0.28 percent master solution was prepared using a 34.7 liters/minute stream of water containing a wetting agent. After a five minute saturation period, the solution was diluted to 700 ppm or was treated further as stated in Examples 2 and 3 below.

EXAMPLE 2

The master solution of Example 1 was subjected to additional shear in a six-stage pump, whereby a static mixer installed on the pressure side was used to adjust the residence time of the solution in the pump to about 3.2 seconds. The energy density was 3.5 watt/liter. The resulting solution was then diluted to a final concentration of 700 ppm.

EXAMPLE 3

The master solution of Example 1 was subjected to further shear in a six-stage pump, whereby the residence time of the solution in the pump was adjusted to about 6.5 seconds using the method described in Example 2. The energy density was about 6.9 watts/liter. The solutions treated in this manner were then diluted to a final concentration of 700 ppm. The solutions prepared in accordance with Examples 2 and 3 have the following advantages compared with the solution from Comparison Example 1:

1. A significant improvement in filterability was achieved. After ten hours flow through a 3 μm Millipore filter at a constant flow rate of 10 ml/hour and at a polymer concentration of 700 ppm, in the case of the nontreated solution (1), a pressure differential of 110 mbar formed at the filter. For the solutions which were treated with a single-stage centrifugal pump or a six-stage pump (2) and (3), the pressure differentials were only 12 mbar (solution 2) and 5 mbar (solution 3).

The viscosities were also measured for the three polymer solutions at two different shear rates; the results are summarized in Table 1. These results show that the viscosities of the polymer solutions of Examples 2 and 3 were not significantly affected by the treatment process.

TABLE I

| Shear Rate | $10\ s^{-1}$ | $100\ s^{-1}$ |
|---|---|---|
| $\eta$ (1) [mPas] | 40.5 | 15.9 |
| $\eta$ (2) [mPas] | 37.8 | 15.3 |
| $\eta$ (3) [mPas] | 35.4 | 14.8 |

2. The residual resistance factor (RRF) can be changed in a controlled manner and, hence, optimized by altering the intensity of the further mechanical treatment. Measured on rock cores from Bentheim Sandstone (permeability about 1800 m Darcy, porosity about 30 percent), RRF = 1.5 for the non-retreated solution (1); RRF = 1.2 and RRF = 1.0 for solutions (2) and (3) retreated as described.

3. The curve for the resistance factor (RF) at low flow rates reaches a plateau with the resheared solutions (2) and (3). This plateau is located at RF = 38 for solution (3) and RF = 52 for solution (2). By contrast, the RF for solution (1) in the range of $0.01 \text{ m/d} < V_D < 0.1 \text{ m/d}$ continues to increase and exceeds RF=80. It is nevertheless possible to control the flowability of the polymer solutions at the lowest velocities, over wide ranges, by retreatment.

4. At a typical injection velocity of $V_D=10$ m, the nonsheared solution (1) has an RF value of 65.d The corresponding values for solutions (2) and (3) are RF=22 for solution (2) and RF=10 for solution (3), so that these solutions can be injected much more easily, especially since they also exhibit better filtration characteristics.

5. The effective viscosity in pore flow streams, which is important for the mobility-reducing effect of the polymer solution, is nearly unaffected by reshearing. This effective viscosity may be calculated using equation (1).

$$n_{eff} = \eta_\omega RF/RRF \quad (1)$$

where:

$\eta_{eff}$ = effective viscosity
$\eta_\omega$ = viscosity of water
RF = resistance factor
RRF = residual resistance factor For average deposit velocities of $V_D=0.1$ m/d and $V_d=1$ m/d effective viscosities according to equation (1) are:

| $V_D \left[\dfrac{m}{d}\right]$ | | 0.1 | 1 |
| --- | --- | --- | --- |
| $\eta_{eff}$ | (1) [mPas] | 33.6 | 20.3 |
| $\eta_{eff}$ | (2) [mPas] | 32.4 | 19.6 |

-continued

| $V_D \left[\dfrac{m}{d}\right]$ | | 0.1 | 1 |
| --- | --- | --- | --- |
| $\eta_{eff}$ | (3) [mPas] | 31.0 | 18.8 |

Hence, the mechanical retreatment of the polymer solutions in accordance with the subject process permits simultaneous optimization of the criteria previously mentioned in sections 1 through 5 and permits the improvement of flooding-specific properties, something which was not possible in the scope with previously known shear processes.

The embodiments of the invention in which an exclusive privilege or property is claimed are defined as follows:

1. A process for optimizing the properties with regard to filterability, polymer retention, flow behavior in low permeability zones, decreased viscosity and high effective viscosity in pore flow of aqueous polymer solutions, containing up to 5000 ppm of copolymers of acrylamide and sodium acrylate or partially saponified polyacrylamides, for use in polymer flooding, which comprises at ambient temperature treating the polymer solutions under turbulent flow conditions in a centrifugal pump such that the residence time of the polymer solution in this equipment is from about 3 seconds to less than approximately 20 seconds and the pump energy used is 1 to 15 watts/liter of solution processed.

2. The process of claim 1 wherein a multiple stage centrifugal pump is used.

3. The process of claim 1, wherein solutions of copolymers containing acrylamide and acrylate having a weight average molecular weight of from $1 \times 10^6$ to $40 \times 10^6$ are used.

4. The process of claim 1, wherein residence time of the solution in the pump is adjusted by a static mixer.

5. The process of claim 1, wherein the polymer solution or a partial stream of the polymer solution is directed in a loop and is repeatedly treated in a centrifugal pump.

* * * * *